(12) United States Patent
Carlson

(10) Patent No.: US 7,389,267 B2
(45) Date of Patent: Jun. 17, 2008

(54) ELECTRONIC VERIFICATION SYSTEM AND METHOD

(76) Inventor: Michael Carlson, 8025 36th Ave. S., Seattle, WA (US) 98118-4304

( * ) Notice: Subject to any disclaimer, the term of this patent is extended or adjusted under 35 U.S.C. 154(b) by 402 days.

(21) Appl. No.: 10/068,106

(22) Filed: Feb. 5, 2002

(65) Prior Publication Data

US 2002/0107815 A1    Aug. 8, 2002

(51) Int. Cl.
*G06Q 40/00*    (2006.01)
*G06K 5/00*    (2006.01)
*G06F 17/00*    (2006.01)
(52) U.S. Cl. .................... 705/39; 700/232; 235/380
(58) Field of Classification Search .................. 705/26, 705/75, 76, 77, 79, 39, 78; 235/380; 700/232
See application file for complete search history.

(56) References Cited

U.S. PATENT DOCUMENTS 4,016,404 A * 4/1977 Appleton .................... 235/380
4,926,325 A * 5/1990 Benton et al. ................ 705/39
5,130,519 A * 7/1992 Bush et al. ................. 235/380
6,000,832 A * 12/1999 Franklin et al. ............. 700/232
6,879,966 B1 * 4/2005 Lapsley et al. ............... 705/78
2001/0047323 A1 * 11/2001 Schmidt ...................... 705/37
2002/0065769 A1 * 5/2002 Irribarren et al. ............. 705/37

* cited by examiner

*Primary Examiner*—Andrew J. Fischer
*Assistant Examiner*—Charles C Agwumezie
(74) *Attorney, Agent, or Firm*—Christopher T L Douglas; Black Lowe & Graham

(57) ABSTRACT

A computer based system, method, and computer program product for performing verification between two parties. The system generates buyer and seller sample data from data stored on buyer and seller systems based on a determined transaction time and the account numbers. The system sends the generated sample data to an administrator system, if a comparison between the generated buyer and seller sample data is positive. The administrator system completes the transaction, if the sent data compares positively to data previously stored in the administrator system.

21 Claims, 8 Drawing Sheets

200

| | B | D | E | A | C | F |
|---|---|---|---|---|---|---|
| B | 4 | 5 | E | C | D | 33 |
| E | L | M | 13 | 11 | 12 | 253 |
| A | A | B | 3 | 1 | 2 | 176 |
| C | F | G | 8 | 6 | 7 | 52 |
| D | 9 | 10 | K | I | J | 86 |

| | A | B | C | E | D | F |
|---|---|---|---|---|---|---|
| A | 1 | A | 2 | 3 | B | 155 |
| C | 6 | F | 7 | 8 | G | 189 |
| D | I | 9 | J | K | 10 | 223 |
| E | 11 | L | 12 | 13 | M | 34 |
| B | C | 4 | D | E | 5 | 97 |

| | A | B | C | D | E | F |
|---|---|---|---|---|---|---|
| A | 1 | A | 2 | B | 3 | 176 |
| B | C | 4 | D | 5 | E | 33 |
| C | 6 | F | 7 | G | 8 | 52 |
| D | I | 9 | J | 10 | K | 86 |
| E | 11 | L | 12 | M | 13 | 253 |

| | A | B | C | D | E | F |
|---|---|---|---|---|---|---|
| A | 1 | A | 2 | B | 3 | 155 |
| B | C | 4 | D | 5 | E | 97 |
| C | 6 | F | 7 | G | 8 | 189 |
| D | I | 9 | J | 10 | K | 223 |
| E | 11 | L | 12 | M | 13 | 34 |

FIG. 5D.

|   | B | C | A | E | D | F |
|---|---|---|---|---|---|---|
| D | 9 | J | I | K | 10 | 176 |
| C | F | 7 | 6 | 8 | G | 33 |
| B | 4 | D | C | E | 5 | 52 |
| E | L | 12 | 11 | 13 | M | 86 |
| A | A | 2 | 1 | 3 | B | 253 |

FIG. 5F.

|   | B | C | A | E | D | F |
|---|---|---|---|---|---|---|
| D | 9 | J | I | K | 10 | 155 |
| C | F | 7 | 6 | 8 | G | 97 |
| B | 4 | D | C | E | 5 | 189 |
| E | L | 12 | 11 | 13 | M | 223 |
| A | A | 2 | 1 | 3 | B | 34 |

FIG. 5G.

|   | B | C | A | E | D | F |
|---|---|---|---|---|---|---|
| D | 9 | J | I | K | 10 | 176 |
| C | F | 7 | 6 | 8 | G | 33 |

FIG. 5H.

|   | B | C | A | E | D | F |
|---|---|---|---|---|---|---|
| D | 9 | J | I | K | 10 | 155 |
| C | F | 7 | 6 | 8 | G | 97 |

FIG. 5I.

ELECTRONIC VERIFICATION SYSTEM AND METHOD

FIELD OF THE INVENTION

This invention relates to transactions and, more particularly, to electronic cash transactions.

BACKGROUND OF THE INVENTION

Electronic transaction systems have been implemented as an electronic check, a debit card, a stored value card, electronic cash or the like. These systems and others are, to some extent, trying to model real cash currently passing in the real world. Real cash is easy to carry, easy to authenticate, transferable, untraceable, and anonymous. However, many of these systems fail to truly provide a simple system that can simulate real cash with a high level of assurances that the occurring electronic transaction is safe and secure.

SUMMARY OF THE INVENTION

The present invention comprises a computer based system, method, and computer program product for performing verification between two parties. The system stores a buyer account number and account data on a buyer system and a seller account number and account data on a seller system. The system determines a transaction amount and time. Then, the system generates a first set of sample data from the data stored on the buyer system based on the determined transaction time and the account numbers associated with the account data previously stored on the buyer and seller systems. The system also generates a second set of sample data from the data previously stored on the seller system based on the determined transaction time and the account numbers associated with the account data previously stored on the buyer and seller systems. The system compares at least a portion of the generated first set of sample data to the second set of sample data and sends the generated sample data to an administrator system, if the comparison is positive. The administrator system compares unique data included in the first set of sample data to unique data previously stored at the administrator system that is associated with the buyer account number and compares unique data included in the second set of sample data to unique data previously stored at the administrator system that is associated with the seller account number. The administrator system completes the transaction, if the unique data comparisons are positive.

In accordance with further aspects of the invention, the generated first and second set of sample data is further generated based on the transaction amount.

In accordance with other aspects of the invention, the seller system is in communication with the administrator system over a network.

In accordance with still further aspects of the invention, the seller system is in communication with the buyer system over a network.

As will be readily appreciated from the foregoing summary, the invention provides a verification system and process.

BRIEF DESCRIPTION OF THE DRAWINGS

The preferred and alternative embodiments of the present invention are described in detail below with reference to the following drawings.

FIGS. 5A-I and 6 are matrices illustrating example data storage and manipulation techniques.

DETAILED DESCRIPTION OF THE PREFERRED EMBODIMENT

Figure 1:
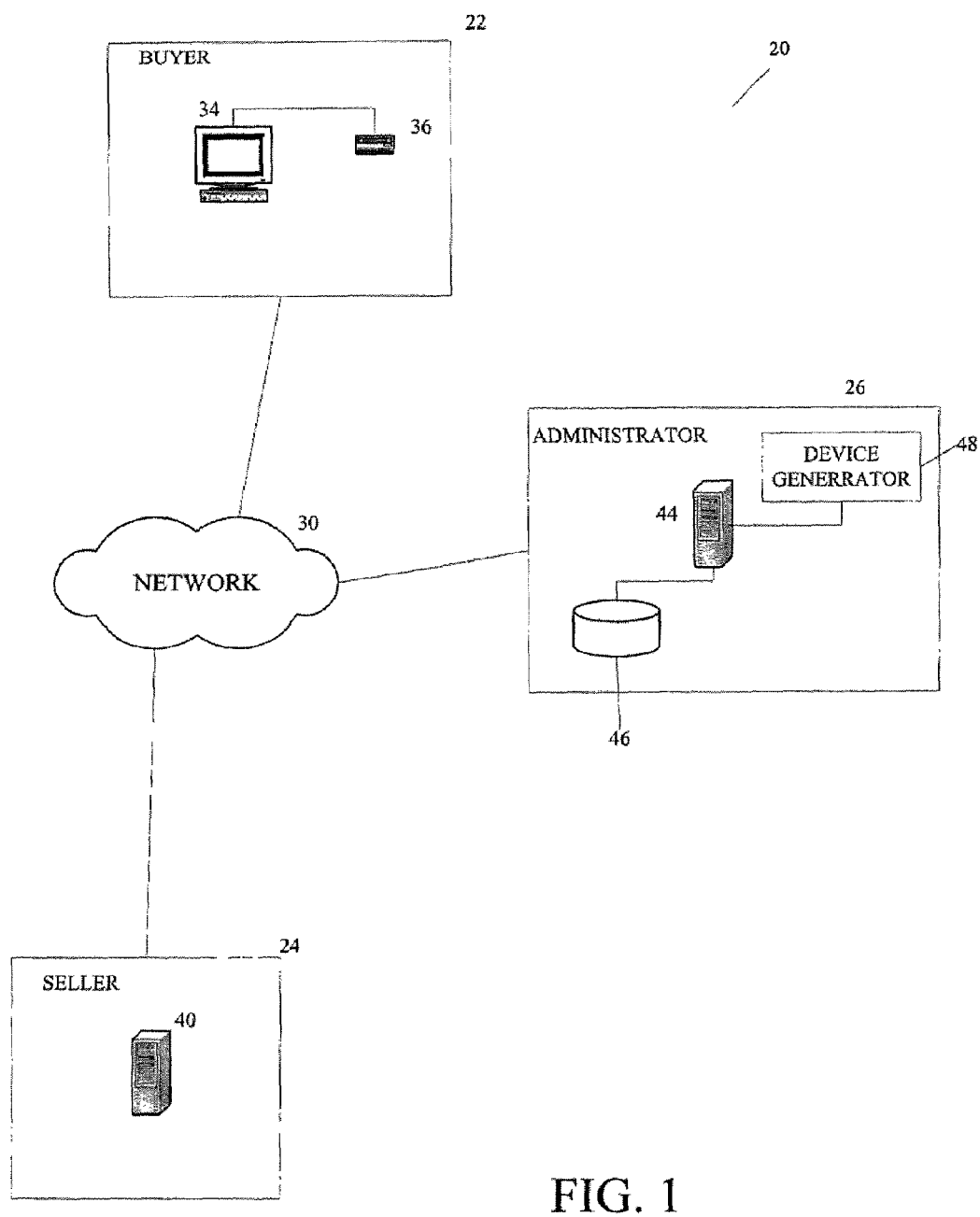
FIG. 1 is a system block diagram formed in accordance with the present invention.

FIG. 1 illustrates an example system 20 that implements an electronic transaction verification process in accordance with the present invention. The system 20 includes at least one buyer at a buyer system 22, at least one seller at a seller system 24, and an administrator at an administrator system 26. In one embodiment the buyer system 22, seller system 24, and administrator system 26 are all in communication with each other over a network 30. The buyer system 22 includes a personal computer 34 or similar device and an electronic media device reader 36. The seller system 24 includes a processor 40 with memory. The administrator system 26 includes a processor 44, a database 46, and an electronic media device generator 48.

The administrator system 26 creates multiple sets of unique account data (UAD) that are sent to the buyer and seller systems 22 and 24 before a transaction occurs between the buyer and seller. One set of UAD is sent to the buyer system 24 and another set of UAD is sent to the seller system 26. The UAD sets are sent on a digital recording/electronic media device (such as a smart card, a compact disc, a digital videodisk, a memory stick, or similar device), or are sent electronically over the network 30.

When the buyer and seller have agreed upon a purchase price for the transaction, if the transaction is a purchase transaction, portions of the UADs are used by the seller system (preferably) to verify that the transaction can be completed. After a positive verification, the portions of the UADs and transaction information are sent to the administrator system 26. The administrator system 26 uses the portions of the UADs to complete the transaction (i.e., a transfer of memory between the buyer's account and the seller's account). This is described in more detail below in FIGS. 2-4 and by example in FIGS. 6A-C.

Figure 2A:
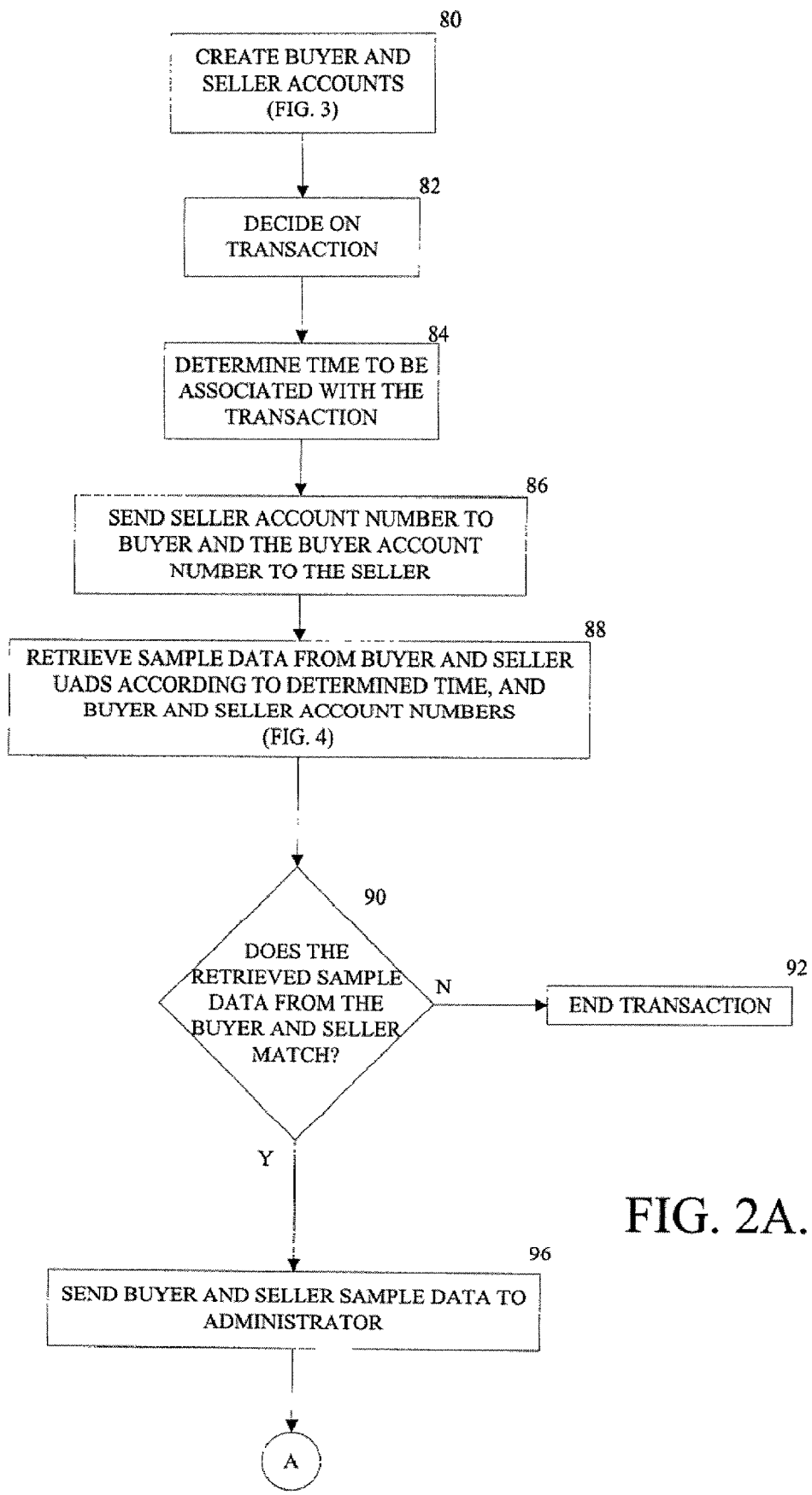
FIGS. 2A and B, 3 and 4 are flow diagrams illustrating a preferred process performed by the system shown in FIG. 1.
Figure 2B:
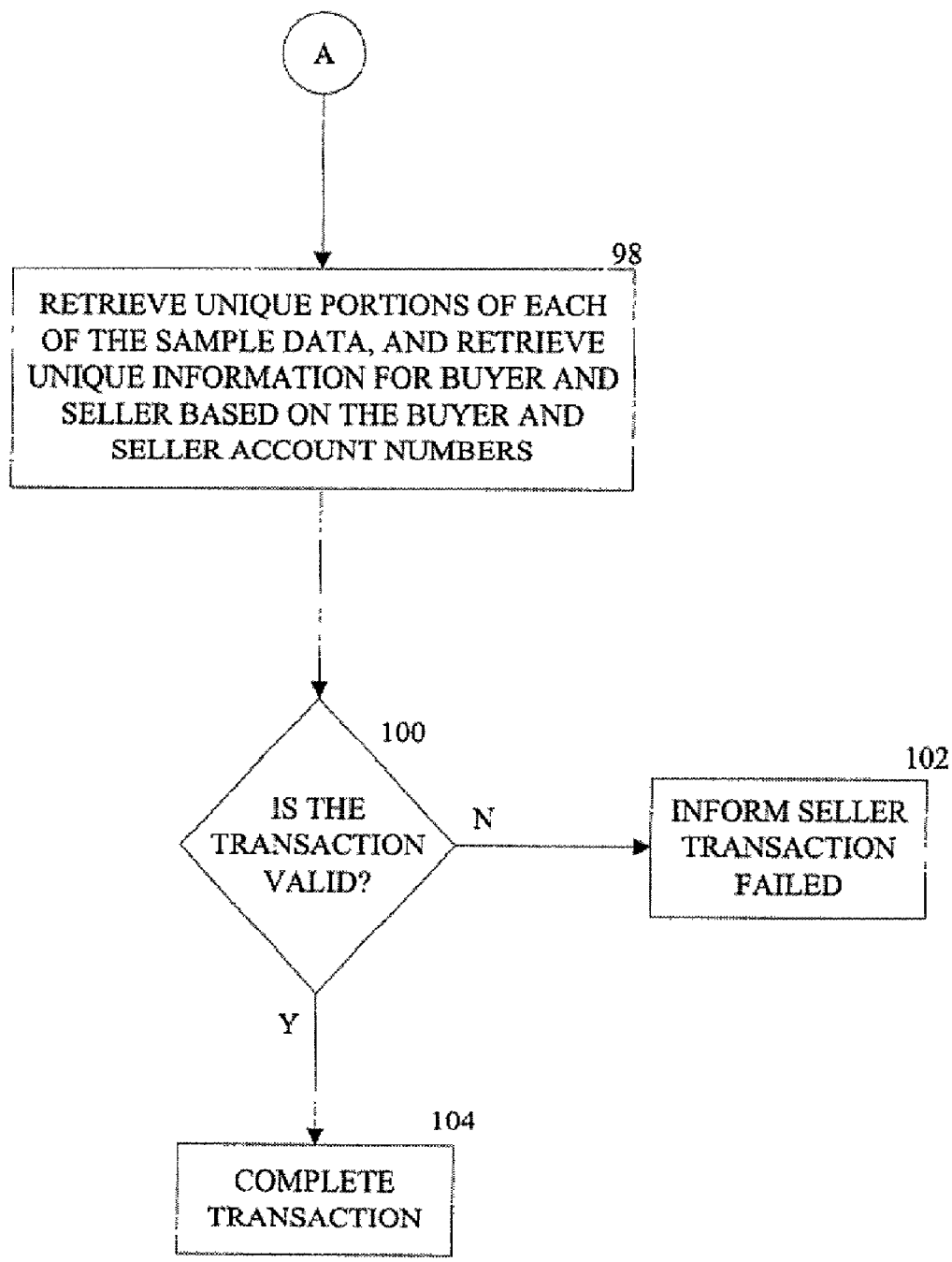

FIGS. 2A and B illustrate a monetary transaction process between a buyer and a seller. First, buyer and seller accounts are created at the administrator system 26, see block 80. A set of UAD is provided to the holder (buyer or seller) of the account prior to any transactions. Transactions are not limited to purchase transactions, but may be any transaction where third party verification can be applied (such as time stamp verification, signature verification, etc.). Buyer and seller account creation is described in more detail below in FIG. 3. A specific example of the structure of UADs are described in more detail below. The following are example account types that can be created:

A cash account—treated like cash;

Standard business account—assets can be sent to this account without restriction; assets within account can only be transferred to a predetermined account;

Business with outgoing assets account—outgoing assets are possible; may have minimum or maximum restrictions on amount that can be transferred out;

As needed account—no assets in account until required; can be setup to draw from another account when required;

A one time account—setup with assets and when assets are gone the account is closed;

Time stamp account—this account performs time verification; performs a time stamp when a transaction occurred (such as mail delivery);

Large asset account—a one time account to transfer large assets; requires a password in order to complete the transaction;

Restricted account—not accepted by all sellers (e.g., a child's account);

Witness account—used to witness a transaction (UAD included with a signature).

At block 82, a buyer negotiates with a seller to purchase a particular product or service at an agreed upon price at a specific time, see block 84. Then, at block 88, application programs located on the buyer and seller system 22 and 24 take a sample of the respective UADs. The samples are based on the buyer's account number, the seller's account number, and the specific transaction time. Then, at decision block 90, the generated samples are compared to determine if a match occurs. If a match occurs, the transaction proceeds. However, if a match does not occur, the transaction fails and does not proceed, see block 92. With a positive match of the samples, the samples, buyer and seller account numbers, and the agreed upon purchase price are sent to the administrator system 26, see block 96

When the administrator system 26 generates a UAD, the UAD includes common data and unique data. The administrator system 26 stores a copy of the unique data in the database 46 with the corresponding account number. Next, at block 98, the administrator system 26 retrieves the unique data of each UAD sample and retrieves the previously stored copy of the unique data in the database for the buyer and seller based on the buyer and seller account numbers. Then, at decision block 100, the administrator system 26 compares the retrieved stored buyer unique data to the retrieved data from the buyer's UAD sample, and compares the retrieved stored seller unique data to the retrieved data from the seller's UAD sample. If at least one of the comparisons failed, the transaction fails and the seller or buyer is informed, see block 102. If both comparisons are positive, the administrator system 26 completes the transaction by transferring cash value from the buyer's account to the seller's account based on the transaction amount, see block 104.

Figure 3:
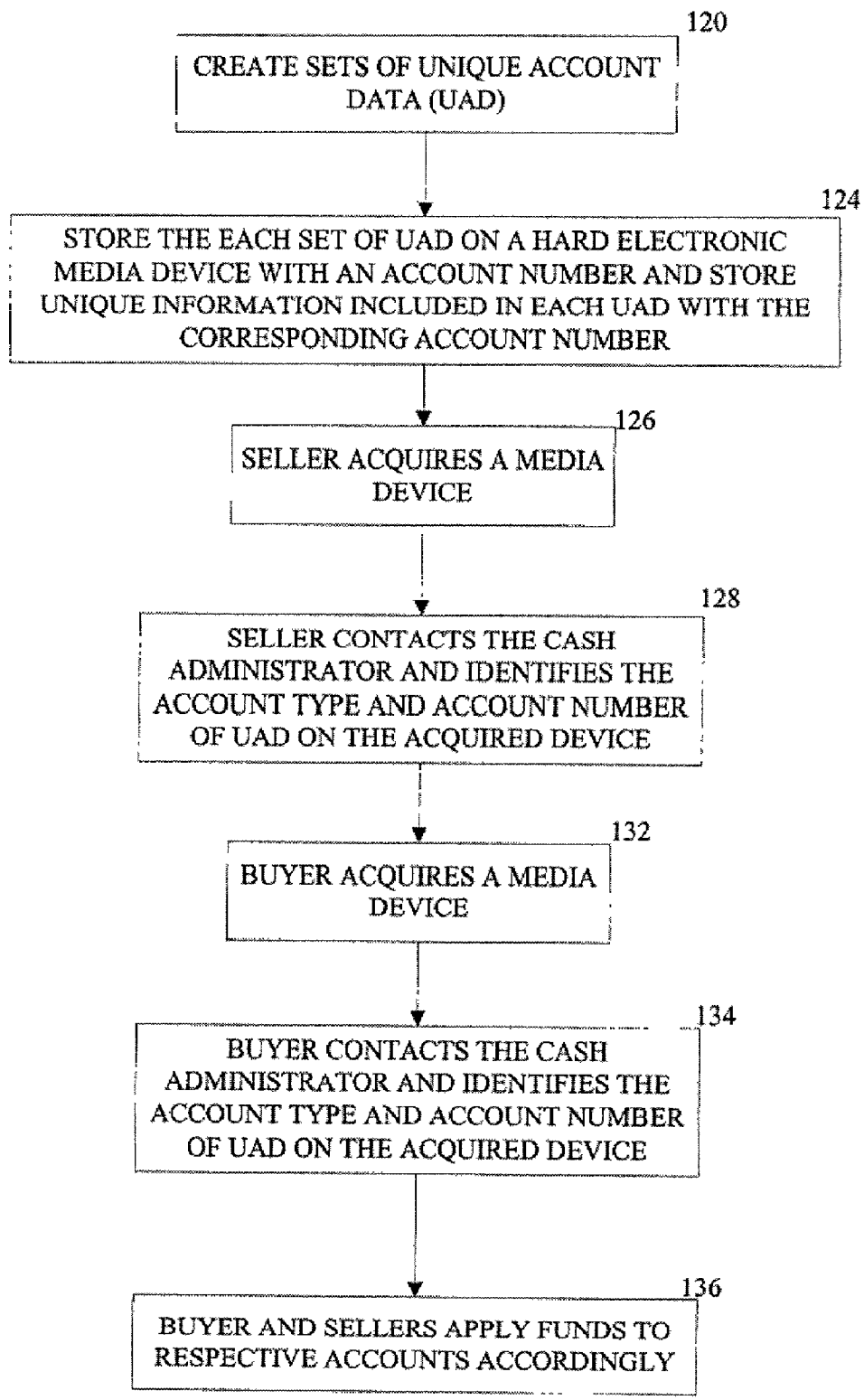

FIG. 3 illustrates an example process for performing the creation of buyer and seller accounts from block 80 of FIG. 2A. First, at block 120, the administrator system 26 creates sets of UAD. Each UAD set includes a plurality of matrices. Each matrix in the UAD set has a common set of data and unique data. The common data set is common to all matrices in all the created UAD sets. The unique data appears in each matrix of a UAD set, but does not appear in other UAD sets. Next, at block 124, the administrator system 26 or the administrator system's processor 24 stores the created sets of UAD on a hard electronic media device with an account number and stores the unique data of each created UAD in the database 46 with a corresponding account number. The device generator 48 stores UADs on hard electronic media devices. The device generator 48 is coupled to the processor 44. At block 126, the seller acquires a media device that includes a set of UAD and an account number. Next, at block 128, the seller contacts the administrator and identifies the account type and account number of the UADs stored on the acquired device. The administrator system 26 records the identified account type with the stored account information associated with the account number.

At block 132, the buyer acquires a media device. Then, at block 134, the buyer contacts the administrator and identifies the account type and account number of the UAD stored on the acquired device. The administrator system 26 also records the identified buyer account type with the account number and UAD information associated with the UAD stored in the device acquired by the buyer. Finally, at block 136, buyers and sellers apply funds to their respective accounts according to how their accounts are used, i.e., account type.

Figure 4:
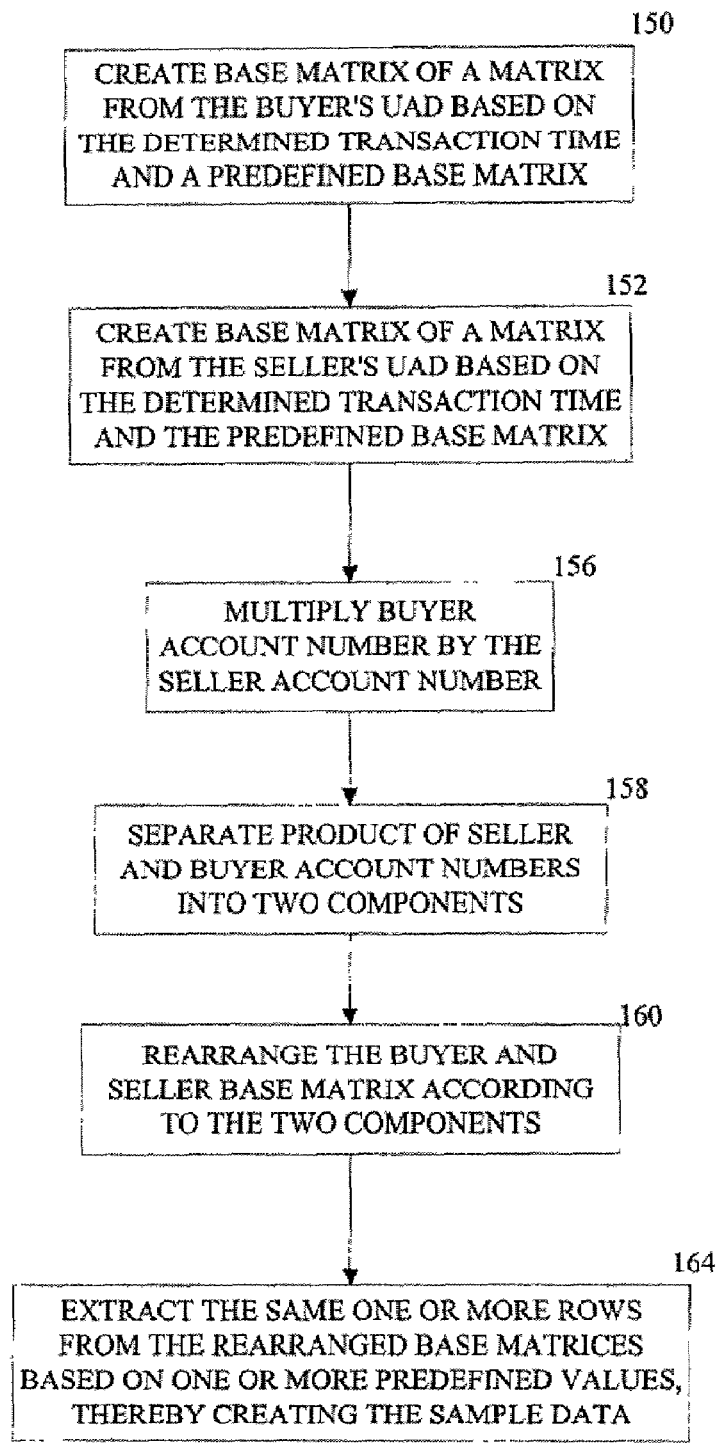

FIG. 4 illustrates in more detail the process performed at block 88 from FIG. 2A. The step performed at block 88 provides for retrieving of sample data from buyer and seller's UADs according to the determined transaction time, and buyer and seller account numbers. First, at block 150, the program running on the buyer system's personal computer 34 creates a base matrix from a matrix retrieved from the buyer's UAD based on the determined transaction time and a predefined base matrix orientation. Examples of matrices that can be used are described in more detail below. Next, at block 152, the program running on the seller system's processor 40 creates a base matrix from a matrix retrieved from the seller's UAD based on the determined transaction time and the predefined base matrix orientation. Although each matrix in a UAD includes the same data (unique and common data), the addressing of each matrix is oriented differently. So, a value stored in a first matrix at a first location is stored in a different location in a second matrix, but still has the same address. Next, at block 156, the buyer account number is multiplied by the seller account number at each of the buyer and seller systems 22 and 24. Then, at block 158, the product of the multiplied account numbers is separated into two components based on a random separation point. These two components are used as x axis and y axis scrambling values for each of the base matrices. It can be appreciated that if the UAD's do not include matrices, but include sets of single row data, then the product of the multiplication between the buyer account number and seller account number is not separated and is used as the value to scramble a selected single row of data from the UAD. At block 160, the programs in the buyer and seller systems 22 and 24 rearrange/scramble the created buyer and seller base matrices according to the two components. The algorithm for rearranging the matrices will be described in more detail below by example in FIGS. 6A-C. Finally, at block 164, each of the programs create sample data by extracting the same one or more rows or columns from each of the rearranged base matrices based on one or more predefined values.

FIGS. 5A-I illustrate examples of the mathematics performed on example buyer and seller UAD matrices. After a transaction time is set, the seller system retrieves a matrix 200 and the buyer system retrieves a matrix 204, see FIGS. 5A, B, from their respective UADs according to the transaction time. The matrices 200, 204 include common data in columns A-E and unique data in column F. FIG. 5C shows a base matrix 208 that is an unscrambled base version of matrix 200. The unscrambling of matrix 200 is performed using a predefined unscramble code/key (i.e., a x-axis unscramble code and a y-axis unscramble code) that is specific to the matrix 200 for generating the base matrix 208. FIG. 5D shows a base matrix 210 that is an unscrambled base version of matrix 204. The unscrambling of matrix 204 is performed using a predefined unscramble code/key (i.e., a x-axis unscramble code and a y-axis unscramble code) that is specific to the matrix 204 for generating the base matrix 210. In each base matrix 208, 210 column F preferably remains in the same position. In one embodiment, the unscrambling can generate a base matrix that is unique to the time. A base matrix generated a minute from now will be scrambled differently from a base matrix generated 5 minutes from now.

Then, the buyer and seller account numbers are multiplied together and randomly separated into two components. In this example, the two separated components are 87 and 31. The number 87 is used to rearrange the rows and 31 is used to rearrange the columns. In order to perform the rearrangement, the rows and columns of the base matrices 208, 210 are given number. From left to right (in the columns) and from top to bottom (in the rows) the columns and rows are identified as 0, 1, 2, 3, 4 positions. To rearrange the rows the following is performed:

$$87/(4 \times 3 \times 2 \times 1) = 3 \quad (1)$$

The value 3 represents the row position from the base matrix 208 that is selected to be positioned in the top row in the rearranged matrix. Therefore, the first row in the new matrix is the 3 position row from the base matrix 208. The 3 position row is the D row. Now the E row is moved up one number to the 3 position. The remainder is 15 from Equation 1 above. To continue the rearranging:

$$15/(3 \times 2 \times 1) = 2 \quad (2)$$

The value 2 represents the row position from the base matrix 208 that is selected to be positioned in the next lower row in the rearranged matrix. Therefore, the second row in the new matrix is the 2 position row from the base matrix 208. The 2 position row is the C row. Now the E row moves into C row's old position, i.e., the 2 position. The remainder is 3 from Equation 2 above. To continue the rearranging:

$$3/(2 \times 1) = 1 \quad (3)$$

The value 1 represents the row position from the base matrix 208 that is selected to be positioned in the next lower row in the rearranged matrix. Therefore, the third row in the new matrix is the 1 position row from the base matrix 208. The 1 position row is the B row. Now, the E row moves into B row's old position, i.e., the 1 position. The remainder is 1 from Equation 2 above. To continue the rearranging:

$$1/1 = 1 \quad (4)$$

The value 1 represents the row position from the base matrix 208 that is selected to be positioned in the next lower row in the rearranged matrix. Therefore, the fourth row in the new matrix is the 1 position row from the base matrix 208. The 1 position row is the E row. Now the only row that remains is the A row. The A row is then inserted as the fifth row of the rearranged matrix. The new row order is from top to bottom DCBEA.

The following is the rearranging process performed in the same manner for the columns of the base matrix 210:

31/4!=1=column B
remainder 7;
7/3!=1=column C
remainder 1;
1/2!=0=column A
remainder 1;
1/1!=1=column E;
last column D.

The new column order is from left to right BCAED. See new buyer and seller matrices 214, 216 in FIGS. 5F, G.

In the above example, a product of the account numbers was used in the scrambling of the base matrix. In an alternate embodiment, other numbers, such as the agreed upon purchase price, the year, or user's birth dates, can be combined with the account numbers in order to provide more complexity to the process.

Now, a sample is taken from the new matrices 214, 216. In this example the sample is the first two rows, see FIGS. 5H, I. The common data (the first 5 columns) in the samples are then compared. If a match occurs, the first part of the transaction is complete and the samples, the transaction amount, and the buyer and sellers account numbers are sent to the administrator system 26. The administrator system 26 compares to the unique data values in the F columns to unique data stored in the database 46 according to the buyer and sellers account numbers. With a positive comparison result the transaction process is completed.

Figure 6:
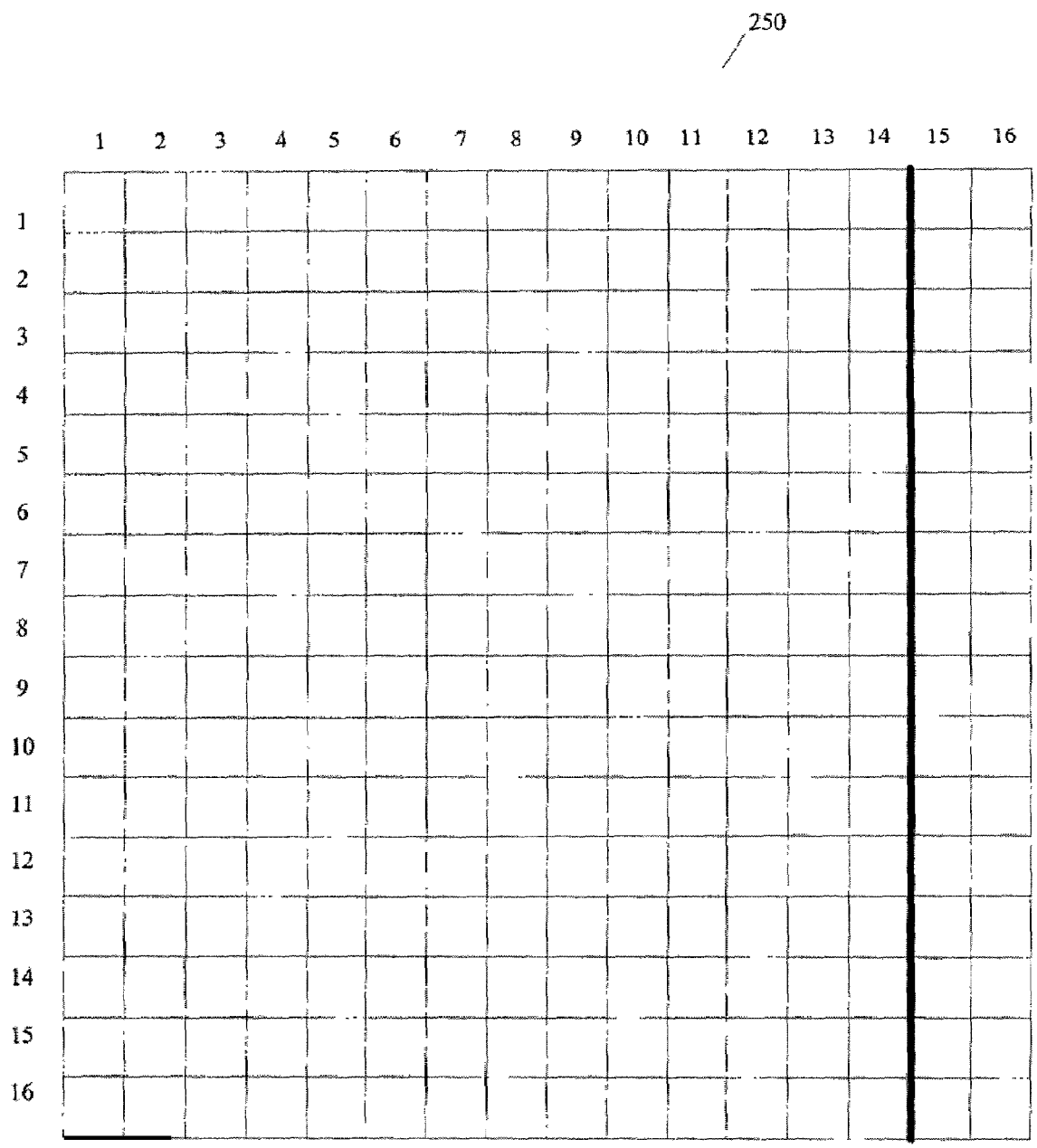

FIG. 6 illustrates an alternate embodiment of the present invention. In this embodiment, the UADs use a 16×16 matrix 250. Each matrix 250 is associated with a specific minute in 7 day periods for 221 weeks. Therefore, there are 10080×221 different matrices 250 included in each UAD. Stored in each storage location in the matrices 250 is an 8-bit code. Columns 1-14 are for common data and columns 15 and 16 are reserved for unique data. The media device that stores the UAD also includes program code, scramble codes and any necessary secondary data required for execution. A sample matrix 258 that is taken from the matrix 250 includes one or more rows or columns from the common data portion and one or more rows from the unique data portion. It can be appreciated that the location of unique data can be located on the bottom two rows or at other locations with the matrix.

The present invention can be implemented in various environments. For example, a buyer or transaction initiator (TI) receives a UAD on a smart card that can interface with a machine, such as a vending machine, a payphone, or a parking meter, that can perform the same functionality as the seller system 24. The machine may have a wireless connection to the network 30.

In another example, the UAD is stored on a memory stick that when inserted in a PDA allows a TI to interface with compatible systems in a store.

While the preferred embodiment of the invention has been illustrated and described, as noted above, many changes can be made without departing from the spirit and scope of the invention. Accordingly, the scope of the invention is not limited by the disclosure of the preferred embodiment.

The embodiments of the invention in which an exclusive property or privilege is claimed are defined as follows:

1. A computer based verification method comprising:
   creating multiple sets of unique account data on an administrator system and transmitting electronically the unique account data to a buyer system and a seller system prior to each transaction;
   storing a buyer account number and the unique account data on the buyer system;
   storing a seller account number and the unique account data on the seller system;
   determining a transaction amount;
   determining a transaction time;
   generating a first set of sample data from the data stored on the buyer system based on the determined transaction time and the account numbers associated with the account data previously stored on the buyer and seller systems;
   generating a second set of sample data from the data previously stored on the seller system based on the determined transaction time and the account numbers associated with the account data previously stored on the buyer and seller systems;

creating a matrix unique to a single transaction based on a first set of sample data from the buyer and a second set of sample data from the seller;

selecting two digits from a combination of the buyers account number and the sellers account number based on a random number generated from the transaction time such that the first digit is stored as the x value and the second digit as the y value;

scrambling the matrix based on the stored x and y values;

selecting at least one row of data from the buyer and the seller; and sending both the buyers and the sellers row to an administrator when the buyers row matches the sellers row;

retrieving at an administrators system created multiple sets of unique account data sent to the user, the sent sellers row of data, and the sent buyers row of data;

unscrambling the sent data based on the random number used to scramble the matrix;

comparing the created multiple sets of unique data with the unscrambled data retrieved from the buyer and the seller; and completing the transaction, when the unique data comparisons are positive.

2. The method of claim 1, wherein the generated first and second set of sample data is further generated based on the transaction amount.

3. The method of claim 1, wherein the seller system is in communication with the administrator system over a network.

4. The method of claim 1, wherein the seller system is in communication with the buyer system over a network.

5. The method of claim 1, wherein the account data at the buyer and seller systems comprise common data and unique data stored in a plurality of matrices, wherein the matrices are stored according to time.

6. The method of claim 5, wherein the unique data is unique to the associated account number created before the account is issued.

7. The method of claim 5, wherein the common data is commonly addressable to all buyer and seller account numbers in a series.

8. The method of claim 7, wherein each matrix has a unique matrix orientation.

9. The method of claim 8, wherein each matrix comprises an unscramble key.

10. The method of claim 9, wherein generating the first set of sample data comprises retrieving a matrix based on the determined transaction time, generating a base matrix from the retrieved matrix based on the unscramble key associated with the retrieved matrix, generating a scramble matrix based on a product of the buyer and seller account numbers, and producing the sample by retrieving one or more rows or columns from the generated scramble matrix.

11. The method of claim 10, wherein generating the second set of sample data comprises retrieving a matrix based on the determined transaction time, generating a base matrix from the retrieved matrix based on the unscramble key associated with the retrieved matrix, generating a scramble matrix based on a product of the buyer and seller account numbers, and producing the sample by retrieving one or more rows or columns from the generated scramble matrix.

12. A computer based verification system comprising:

an administrator system in communication over a network with at least one of the buyer or seller system that transmits multiple sets of unique account data to a buyer system and a seller system prior to each transaction the buyer system for storing a buyer account number and unique account data; and the seller system in communication with the buyer system for storing a seller account number and unique account data;

wherein at least one of the buyer or seller system comprises:

a first component that determines a transaction amount;

a second component that determines a transaction time;

a third component that generates a first set of sample data from the data stored on the buyer system based on the determined transaction time and the account numbers associated with the account data previously stored on the buyer and seller systems;

a fourth component that generates a second set of sample data from the data previously stored on the seller system based on the determined transaction time and the account numbers associated with the account data previously stored on the buyer and seller systems;

a fifth component that creates a matrix unique to a single transaction based on a first set of sample data from the buyer and a second set of sample data from the seller;

a sixth component that selects two digits from a combination of the buyers account number and the sellers account number based on a random number generated from the transaction time such that the first digit is stored as the x value and the second digit as the y value;

a sixth component that scrambles the matrix based on the stored x and y values;

a seventh component that selects at least one row of data from the buyer and the seller; and an eighth component that sends both the buyers and the sellers row to an administrator when the buyers row matches the sellers row;

wherein the administrator system comprises:

a first component that retrieves at an administrators system created multiple sets of unique account data sent to the user, the sent sellers row of data, and the sent buyers row of data;

a second component that unscrambles the sent data based on the random number used to scramble the matrix;

a third component that compares the created multiple sets of unique data with the unscrambled data retrieved from the buyer and the seller; and a fourth component that completes the transaction when the comparison is positive.

13. The system of claim 12, wherein third and fourth sample generating components generate the sample data based on the transaction amount.

14. The system of claim 12, wherein the account data at the buyer and seller systems comprise common data and unique data stored in a plurality of matrices, wherein the matrices are stored according to time.

15. The system of claim 14, wherein the unique data is unique to the associated account number.

16. The system of claim 14, wherein the common data is commonly addressable to all buyer and seller account numbers in a series.

17. The system of claim 16, wherein each matrix has a unique matrix orientation.

18. The system of claim 17, wherein each matrix comprises an unscramble key.

19. The system of claim 18, wherein the third sample generating component retrieves a matrix based on the determined transaction time, generates a base matrix from the retrieved matrix based on the unscramble key associated with the retrieved matrix, generates a scramble matrix based on a product of the buyer and seller account numbers, and produces the sample by retrieving one or more rows or columns from the generated scramble matrix.

20. The system of claim 19, wherein the fourth sample generating component retrieves a matrix based on the determined transaction time, generates a base matrix from the retrieved matrix based on the unscramble key associated with the retrieved matrix, generates a scramble matrix based on a product of the buyer and seller account numbers, and produces the sample by retrieving one or more rows or columns from the generated scramble matrix.

21. A computer-based verification method comprising:
creating multiple sets of unique account data on an administrator system and delivering to a buyer and a seller prior to each transaction;
verifying a transaction requested by a buyer and a seller further comprising:
creating a matrix unique to a single transaction based on a predefined matrix orientation for the buyer and the seller;
selecting two digits from a combination of the buyers account number and the sellers account number based on a random number generated from the transaction time such that the first digit is stored as the x value and the second digit as the y value;
scrambling the matrix based on the stored x and y values;
selecting at least one row of data from the buyer and the seller; and
sending both the buyers and the sellers row to an administrator when the buyers row matches the sellers row;
retrieving at an administrators system created multiple sets of unique account data sent to the user, the sent sellers row of data, and the sent buyers row of data;
unscrambling the sent data based on the random number used to scramble the matrix;
comparing the created multiple sets of unique data with the unscrambled data retrieved from the buyer and the seller;
completing the transaction when the comparison is positives; and
ending the transaction when the comparison is negative.

* * * * *

UNITED STATES PATENT AND TRADEMARK OFFICE
CERTIFICATE OF CORRECTION

| | |
|---|---|
| PATENT NO. | : 7,389,267 B2 |
| APPLICATION NO. | : 10/068106 |
| DATED | : June 17, 2008 |
| INVENTOR(S) | : Michael Carlson |

It is certified that error appears in the above-identified patent and that said Letters Patent is hereby corrected as shown below:

TITLE PAGE,
    INSERT ITEM -- [60]      Related U.S. Application Data
                        Provisional application No. 60/266,942, filed on Feb. 6, 2001 --

Signed and Sealed this

Second Day of September, 2008

JON W. DUDAS
*Director of the United States Patent and Trademark Office*